(12) United States Patent
Sridhara

(10) Patent No.: US 10,496,501 B2
(45) Date of Patent: *Dec. 3, 2019

(54) CONFIGURATION INCONSISTENCY IDENTIFICATION BETWEEN STORAGE VIRTUAL MACHINES

(71) Applicant: NetApp Inc., Sunnyvale, CA (US)

(72) Inventor: Harsha Sridhara, Bangalore (IN)

(73) Assignee: NetApp Inc., Sunnyvale, CA (US)

( * ) Notice: Subject to any disclaimer, the term of this patent is extended or adjusted under 35 U.S.C. 154(b) by 168 days.

This patent is subject to a terminal disclaimer.

(21) Appl. No.: 15/686,786

(22) Filed: Aug. 25, 2017

(65) Prior Publication Data

US 2017/0351586 A1 Dec. 7, 2017

Related U.S. Application Data

(63) Continuation of application No. 14/836,472, filed on Aug. 26, 2015, now Pat. No. 9,747,178.

(51) Int. Cl.
*G06F 11/00* (2006.01)
*G06F 11/16* (2006.01)
*G06F 11/20* (2006.01)

(52) U.S. Cl.
CPC ...... *G06F 11/1662* (2013.01); *G06F 11/2064* (2013.01); *G06F 11/2069* (2013.01); *G06F 11/2082* (2013.01); *G06F 2201/805* (2013.01); *G06F 2201/82* (2013.01)

(58) Field of Classification Search
CPC ............. G06F 11/1662; G06F 11/2064; G06F 11/2069; G06F 2201/805
See application file for complete search history.

(56) References Cited

U.S. PATENT DOCUMENTS

| 8,949,825 B1 | 2/2015 | Fitzgerald et al. |
| 9,235,474 B1 | 1/2016 | Petri et al. |
| 9,524,389 B1 | 12/2016 | Roth |
| 10,210,010 B1 * | 2/2019 | Ramachandran ... G06F 9/45558 |

(Continued)

OTHER PUBLICATIONS

Non-Final Office Action cited in U.S. Appl. No. 14/836,472 dated Jan. 11, 2017, 12 pgs.

(Continued)

*Primary Examiner* — Joshua P Lottich
(74) *Attorney, Agent, or Firm* — Cooper Legal Group, LLC

(57) ABSTRACT

One or more techniques and/or systems are provided for identifying configuration inconsistencies between storage virtual machines across storage clusters. For example, a first storage cluster and a second storage cluster may be configured according to a disaster recovery relationship where user data and configuration data of the first storage cluster are replicated to the second storage cluster so that the second storage cluster can takeover for the first storage cluster in the event a disaster occurs at the first storage cluster. Because replication of configuration data (e.g., a name and size of a volume, a backup policy, etc.) may fail for various reasons, configuration of the first storage cluster is compared to configuration of the second storage cluster to identify a configuration difference (e.g., a new size of the volume at the first storage cluster may have failed to be replicated to a replicated volume at the second storage cluster).

20 Claims, 13 Drawing Sheets

(56) References Cited

U.S. PATENT DOCUMENTS

2013/0263119 A1 10/2013 Pissay et al.
2016/0259560 A1 9/2016 Ueda
2016/0321455 A1 11/2016 Deng et al.

OTHER PUBLICATIONS

Reply Non-Final Office Action cited in U.S. Appl. No. 14/836,472 dated Apr. 11, 2017, 11 pgs.
Notice of Allowance cited in U.S. Appl. No. 14/836,472 dated Apr. 21, 2017, 13 pgs.
Amendment after Notice of Allowance cited in U.S. Appl. No. 14/836,472 dated Jul. 21, 2017, 8 pgs.

* cited by examiner

US 10,496,501 B2

CONFIGURATION INCONSISTENCY IDENTIFICATION BETWEEN STORAGE VIRTUAL MACHINES

RELATED APPLICATIONS

This application claims priority to and is a continuation of U.S. application Ser. No. 14/836,472, filed on Aug. 26, 2015, now allowed, titled "CONFIGURATION INCONSISTENCY IDENTIFICATION BETWEEN STORAGE VIRTUAL MACHINES," which is incorporated herein by reference.

BACKGROUND

A storage network environment may comprise one or more storage clusters of storage controllers (e.g., nodes) configured to provide clients with access to user data stored within storage devices. For example, a first storage cluster may comprise a first storage controller configured to provide clients with access to user data stored within a first storage device. A second storage cluster may be configured according to a disaster recovery configuration with respect to the first storage cluster, such that user data (e.g., user files, applications, etc.) and configuration data (e.g., a name and size of a volume, a replication policy, a user access policy, a network interface configuration, an IP address, and/or other back-end configuration data of the storage network environment) are replicated from the first storage cluster to the second storage cluster. In this way, when a disaster occurs at the first storage cluster and clients are unable to access user data within the first storage device because the first storage controller may be unavailable or may have failed from the disaster, a second storage controller of the second storage cluster may provide clients with failover access to replicated user data that was replicated from the first storage device to a second storage device accessible to the second storage controller. When the first storage cluster recovers from the disaster, the second storage cluster may switch back to the first storage cluster such that the first storage controller provides clients with access to user data from the first storage device. In this way, user data and configuration data may be backed up between storage clusters for disaster recovery.

Synchronization of configuration data from the first storage cluster to the second storage cluster may fail for various reasons. In an example, configuration mirroring data (e.g., a volume rename operation for a volume at the first storage cluster may be mirrored as the configuration mirroring data to the second storage cluster to rename a corresponding replicated volume to match a new name of the volume) that is to be sent from the first storage cluster to the second storage cluster may fail to be transmitted. In another example, the configuration mirroring data may fail to be applied at the second storage cluster (e.g., configuration data of a first storage virtual machine of the first storage cluster may fail to be applied to a second storage virtual machine, of the second storage cluster, that is configured as a backup storage virtual machine for the first storage virtual machine). In another example, the configuration mirroring data may fail to be recorded at the second storage cluster. Thus, a client may be unaware of the inconsistency in configuration data between the storage clusters (e.g., a volume name change or resize operation may modify volume name configuration data or volume size configuration data at the first storage cluster, but a failure to propagate such configuration data to the second storage cluster may result in the second storage cluster comprising a mirrored volume with a stale/incorrect name or size), which may result in errors (e.g., an error when attempting to access a replicated storage object having a stale out-of-date internet protocol (IP) address), security issues such as unauthorized access (e.g., a stale out-of-date user access policy may still grant a user with access to replicated user data that the user is now not supposed to access), an inability for clients to access to client data (e.g., a user may be unable to access a replicated volume having a stale out-of-date volume name), and/or other failures.

DETAILED DESCRIPTION

Figure 1:
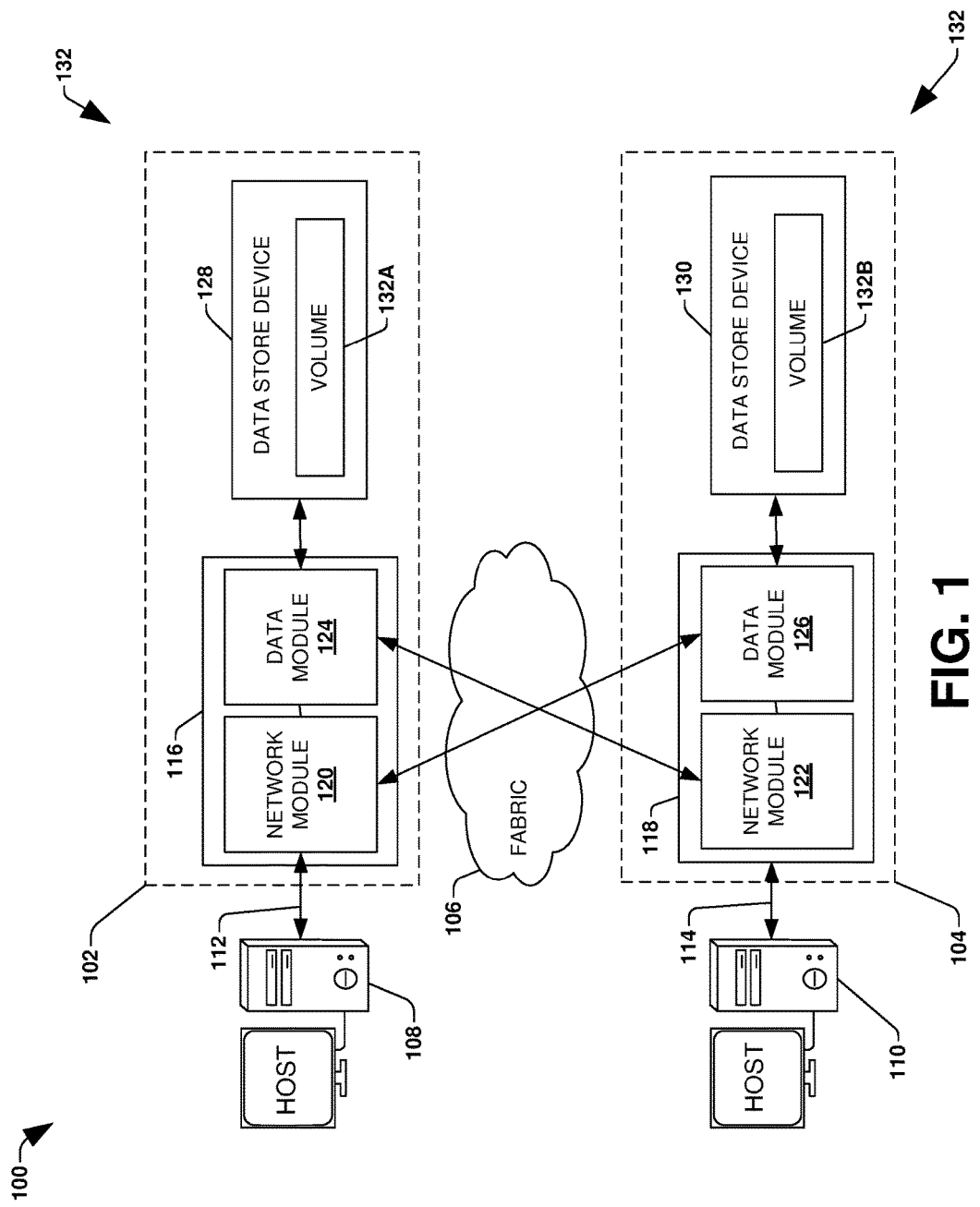
FIG. 1 is a component block diagram illustrating an example clustered network in accordance with one or more of the provisions set forth herein.

Some examples of the claimed subject matter are now described with reference to the drawings, where like reference numerals are generally used to refer to like elements throughout. In the following description, for purposes of explanation, numerous specific details are set forth in order to provide an understanding of the claimed subject matter. It may be evident, however, that the claimed subject matter may be practiced without these specific details. Nothing in this detailed description is admitted as prior art.

One or more systems and/or techniques for identifying configuration inconsistencies between storage virtual machines across storage clusters are provided. A first storage cluster and a second storage cluster may be configured according to a disaster recovery configuration (e.g., a synchronous or an asynchronous disaster recovery mirroring partnership), such that the user data and configuration data of the first storage cluster may be replicated/mirrored from the first storage cluster to the second storage cluster so that the second storage cluster may provide failover access to replicated user data in the event a disaster occurs at the first storage cluster. Similarly, user data and configuration data of the second storage cluster may be replicated/mirrored from the second storage cluster to the first storage cluster so that the first storage cluster may provide failover access to replicated user data in the event a disaster occurs at the second storage cluster. Failure to replicate configuration data may result in inconsistencies (e.g., inconsistent IP addresses, network interfaces, volume names, volume sizes, etc.) that may hinder a failover storage cluster's ability to provide clients with access to replicated user data in the event of a disaster of a primary storage cluster (e.g., a user may be unable to access a replicated volume having an stale out-of-date name). Accordingly, as provided herein, configuration data of a first storage virtual machine, within the first storage cluster, and a second storage virtual machine, within the second storage cluster and having a replication relationship with the first storage virtual machine, may be compared to identify configuration differences. In this way, clients may be notified of configuration differences so that corrective action may be taken.

To provide context for configuration inconsistency identification, FIG. 1 illustrates an embodiment of a clustered network environment 100 or a network storage environment. It may be appreciated, however, that the techniques, etc. described herein may be implemented within the clustered network environment 100, a non-cluster network environment, and/or a variety of other computing environments, such as a desktop computing environment. That is, the instant disclosure, including the scope of the appended claims, is not meant to be limited to the examples provided herein. It will be appreciated that where the same or similar components, elements, features, items, modules, etc. are illustrated in later figures but were previously discussed with regard to prior figures, that a similar (e.g., redundant) discussion of the same may be omitted when describing the subsequent figures (e.g., for purposes of simplicity and ease of understanding).

FIG. 1 is a block diagram illustrating an example clustered network environment 100 that may implement at least some embodiments of the techniques and/or systems described herein. The example environment 100 comprises data storage systems or storage sites 102 and 104 that are coupled over a cluster fabric 106, such as a computing network embodied as a private Infiniband, Fibre Channel (FC), or Ethernet network facilitating communication between the storage systems 102 and 104 (and one or more modules, component, etc. therein, such as, nodes 116 and 118, for example). It will be appreciated that while two data storage systems 102 and 104 and two nodes 116 and 118 are illustrated in FIG. 1, that any suitable number of such components is contemplated. In an example, nodes 116, 118 comprise storage controllers (e.g., node 116 may comprise a primary or local storage controller and node 118 may comprise a secondary or remote storage controller) that provide client devices, such as host devices 108, 110, with access to data stored within data storage devices 128, 130. Similarly, unless specifically provided otherwise herein, the same is true for other modules, elements, features, items, etc. referenced herein and/or illustrated in the accompanying drawings. That is, a particular number of components, modules, elements, features, items, etc. disclosed herein is not meant to be interpreted in a limiting manner.

It will be further appreciated that clustered networks are not limited to any particular geographic areas and can be clustered locally and/or remotely. Thus, in one embodiment a clustered network can be distributed over a plurality of storage systems and/or nodes located in a plurality of geographic locations; while in another embodiment a clustered network can include data storage systems (e.g., 102, 104) residing in a same geographic location (e.g., in a single onsite rack of data storage devices).

In the illustrated example, one or more host devices 108, 110 which may comprise, for example, client devices, personal computers (PCs), computing devices used for storage (e.g., storage servers), and other computers or peripheral devices (e.g., printers), are coupled to the respective data storage systems 102, 104 by storage network connections 112, 114. Network connection may comprise a local area network (LAN) or wide area network (WAN), for example, that utilizes Network Attached Storage (NAS) protocols, such as a Common Internet File System (CIFS) protocol or a Network File System (NFS) protocol to exchange data packets. Illustratively, the host devices 108, 110 may be general-purpose computers running applications, and may interact with the data storage systems 102, 104 using a client/server model for exchange of information. That is, the host device may request data from the data storage system (e.g., data on a storage device managed by a network storage control configured to process I/O commands issued by the host device for the storage device), and the data storage system may return results of the request to the host device via one or more network connections 112, 114.

The nodes 116, 118 on clustered data storage systems 102, 104 can comprise network or host nodes that are interconnected as a cluster to provide data storage and management services, such as to an enterprise having remote locations, cloud storage (e.g., a storage endpoint may be stored within a data cloud), etc., for example. Such a node in a data storage and management network cluster environment 100 can be a device attached to the network as a connection point, redistribution point or communication endpoint, for example. A node may be capable of sending, receiving, and/or forwarding information over a network communications channel, and could comprise any device that meets any or all of these criteria. One example of a node may be a data storage and management server attached to a network, where the server can comprise a general purpose computer or a computing device particularly configured to operate as a server in a data storage and management system.

In an example, a first cluster of nodes such as the nodes 116, 118 (e.g., a first set of storage controllers configured to provide access to a first storage aggregate comprising a first logical grouping of one or more storage devices) may be located on a first storage site. A second cluster of nodes, not illustrated, may be located at a second storage site (e.g., a second set of storage controllers configured to provide access to a second storage aggregate comprising a second logical grouping of one or more storage devices). The first cluster of nodes and the second cluster of nodes may be configured according to a disaster recovery configuration where a surviving cluster of nodes provides switchover access to storage devices of a disaster cluster of nodes in the event a disaster occurs at a disaster storage site comprising the disaster cluster of nodes (e.g., the first cluster of nodes provides client devices with switchover data access to storage devices of the second storage aggregate in the event a disaster occurs at the second storage site).

As illustrated in the exemplary environment 100, nodes 116, 118 can comprise various functional components that coordinate to provide distributed storage architecture for the cluster. For example, the nodes can comprise a network module 120, 122 and a data module 124, 126. Network modules 120, 122 can be configured to allow the nodes 116, 118 (e.g., network storage controllers) to connect with host devices 108, 110 over the network connections 112, 114, for example, allowing the host devices 108, 110 to access data stored in the distributed storage system. Further, the network modules 120, 122 can provide connections with one or more other components through the cluster fabric 106. For example, in FIG. 1, a first network module 120 of first node 116 can access a second data storage device 130 by sending a request through a second data module 126 of a second node 118.

Data modules 124, 126 can be configured to connect one or more data storage devices 128, 130, such as disks or arrays of disks, flash memory, or some other form of data storage, to the nodes 116, 118. The nodes 116, 118 can be interconnected by the cluster fabric 106, for example, allowing respective nodes in the cluster to access data on data storage devices 128, 130 connected to different nodes in the cluster. Often, data modules 124, 126 communicate with the data storage devices 128, 130 according to a storage area network (SAN) protocol, such as Small Computer System Interface (SCSI) or Fiber Channel Protocol (FCP), for example. Thus, as seen from an operating system on a node 116, 118, the data storage devices 128, 130 can appear as locally attached to the operating system. In this manner, different nodes 116, 118, etc. may access data blocks through the operating system, rather than expressly requesting abstract files.

It should be appreciated that, while the example embodiment 100 illustrates an equal number of network and data modules, other embodiments may comprise a differing number of these modules. For example, there may be a plurality of network and data modules interconnected in a cluster that does not have a one-to-one correspondence between the network and data modules. That is, different nodes can have a different number of network and data modules, and the same node can have a different number of network modules than data modules.

Further, a host device 108, 110 can be networked with the nodes 116, 118 in the cluster, over the networking connections 112, 114. As an example, respective host devices 108, 110 that are networked to a cluster may request services (e.g., exchanging of information in the form of data packets) of a node 116, 118 in the cluster, and the node 116, 118 can return results of the requested services to the host devices 108, 110. In one embodiment, the host devices 108, 110 can exchange information with the network modules 120, 122 residing in the nodes (e.g., network hosts) 116, 118 in the data storage systems 102, 104.

In one embodiment, the data storage devices 128, 130 comprise volumes 132, which is an implementation of storage of information onto disk drives or disk arrays or other storage (e.g., flash) as a file-system for data, for example. Volumes can span a portion of a disk, a collection of disks, or portions of disks, for example, and typically define an overall logical arrangement of file storage on disk space in the storage system. In one embodiment a volume can comprise stored data as one or more files that reside in a hierarchical directory structure within the volume.

Volumes are typically configured in formats that may be associated with particular storage systems, and respective volume formats typically comprise features that provide functionality to the volumes, such as providing an ability for volumes to form clusters. For example, where a first storage system may utilize a first format for their volumes, a second storage system may utilize a second format for their volumes.

In the example environment 100, the host devices 108, 110 can utilize the data storage systems 102, 104 to store and retrieve data from the volumes 132. In this embodiment, for example, the host device 108 can send data packets to the network module 120 in the node 116 within data storage system 102. The node 116 can forward the data to the data storage device 128 using the data module 124, where the data storage device 128 comprises volume 132A. In this way, in this example, the host device can access the storage volume 132A, to store and/or retrieve data, using the data storage system 102 connected by the network connection 112. Further, in this embodiment, the host device 110 can exchange data with the network module 122 in the host 118 within the data storage system 104 (e.g., which may be remote from the data storage system 102). The host 118 can forward the data to the data storage device 130 using the data module 126, thereby accessing volume 1328 associated with the data storage device 130.

It may be appreciated that configuration inconsistency identification may be implemented within the clustered network environment 100. For example, a configuration comparison component may be implemented for the node 116 and/or the node 118. The configuration comparison component may be configured to identify configuration inconsistencies between the node 116 and the node 118, such as where the node 116 is hosted within a first storage cluster and the node 118 is hosted within a second storage cluster that is a disaster recovery partner for the first storage cluster.

Figure 2:
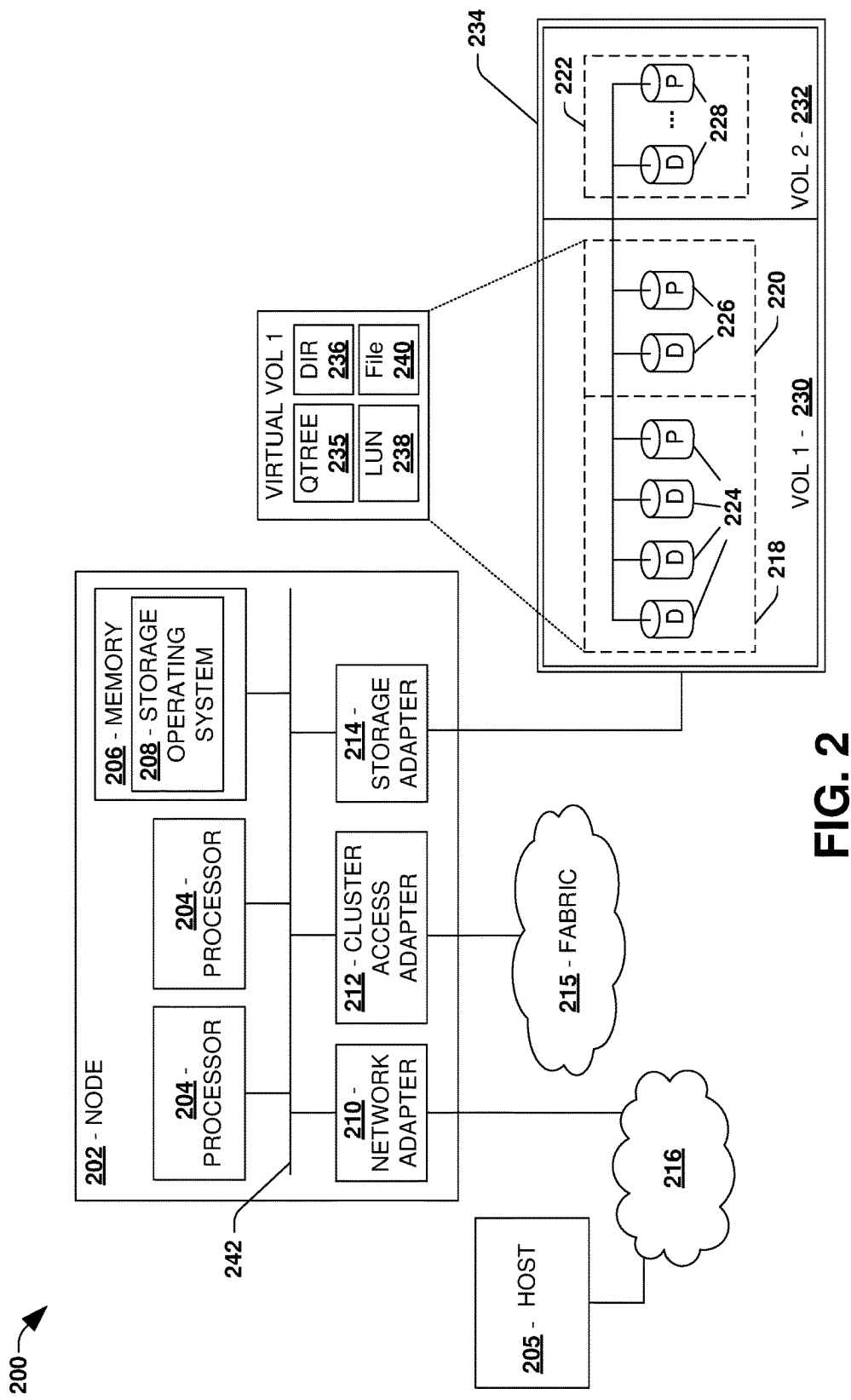
FIG. 2 is a component block diagram illustrating an example data storage system in accordance with one or more of the provisions set forth herein.

FIG. 2 is an illustrative example of a data storage system 200 (e.g., 102, 104 in FIG. 1), providing further detail of an embodiment of components that may implement one or more of the techniques and/or systems described herein. The example data storage system 200 comprises a node 202 (e.g., host nodes 116, 118 in FIG. 1), and a data storage device 234 (e.g., data storage devices 128, 130 in FIG. 1). The node 202 may be a general purpose computer, for example, or some other computing device particularly configured to operate as a storage server. A host device 205 (e.g., 108, 110 in FIG. 1)

can be connected to the node 202 over a network 216, for example, to provides access to files and/or other data stored on the data storage device 234. In an example, the node 202 comprises a storage controller that provides client devices, such as the host device 205, with access to data stored within data storage device 234.

The data storage device 234 can comprise mass storage devices, such as disks 224, 226, 228 of a disk array 218, 220, 222. It will be appreciated that the techniques and systems, described herein, are not limited by the example embodiment. For example, disks 224, 226, 228 may comprise any type of mass storage devices, including but not limited to magnetic disk drives, flash memory, and any other similar media adapted to store information, including, for example, data (D) and/or parity (P) information.

The node 202 comprises one or more processors 204, a memory 206, a network adapter 210, a cluster access adapter 212, and a storage adapter 214 interconnected by a system bus 242. The storage system 200 also includes an operating system 208 installed in the memory 206 of the node 202 that can, for example, implement a Redundant Array of Independent (or Inexpensive) Disks (RAID) optimization technique to optimize a reconstruction process of data of a failed disk in an array.

The operating system 208 can also manage communications for the data storage system, and communications between other data storage systems that may be in a clustered network, such as attached to a cluster fabric 215 (e.g., 106 in FIG. 1). Thus, the node 202, such as a network storage controller, can respond to host device requests to manage data on the data storage device 234 (e.g., or additional clustered devices) in accordance with these host device requests. The operating system 208 can often establish one or more file systems on the data storage system 200, where a file system can include software code and data structures that implement a persistent hierarchical namespace of files and directories, for example. As an example, when a new data storage device (not shown) is added to a clustered network system, the operating system 208 is informed where, in an existing directory tree, new files associated with the new data storage device are to be stored. This is often referred to as "mounting" a file system.

In the example data storage system 200, memory 206 can include storage locations that are addressable by the processors 204 and adapters 210, 212, 214 for storing related software application code and data structures. The processors 204 and adapters 210, 212, 214 may, for example, include processing elements and/or logic circuitry configured to execute the software code and manipulate the data structures. The operating system 208, portions of which are typically resident in the memory 206 and executed by the processing elements, functionally organizes the storage system by, among other things, invoking storage operations in support of a file service implemented by the storage system. It will be apparent to those skilled in the art that other processing and memory mechanisms, including various computer readable media, may be used for storing and/or executing application instructions pertaining to the techniques described herein. For example, the operating system can also utilize one or more control files (not shown) to aid in the provisioning of virtual machines.

The network adapter 210 includes the mechanical, electrical and signaling circuitry needed to connect the data storage system 200 to a host device 205 over a computer network 216, which may comprise, among other things, a point-to-point connection or a shared medium, such as a local area network. The host device 205 (e.g., 108, 110 of FIG. 1) may be a general-purpose computer configured to execute applications. As described above, the host device 205 may interact with the data storage system 200 in accordance with a client/host model of information delivery.

The storage adapter 214 cooperates with the operating system 208 executing on the node 202 to access information requested by the host device 205 (e.g., access data on a storage device managed by a network storage controller). The information may be stored on any type of attached array of writeable media such as magnetic disk drives, flash memory, and/or any other similar media adapted to store information. In the example data storage system 200, the information can be stored in data blocks on the disks 224, 226, 228. The storage adapter 214 can include input/output (I/O) interface circuitry that couples to the disks over an I/O interconnect arrangement, such as a storage area network (SAN) protocol (e.g., Small Computer System Interface (SCSI), iSCSI, hyperSCSI, Fiber Channel Protocol (FCP)). The information is retrieved by the storage adapter 214 and, if necessary, processed by the one or more processors 204 (or the storage adapter 214 itself) prior to being forwarded over the system bus 242 to the network adapter 210 (and/or the cluster access adapter 212 if sending to another node in the cluster) where the information is formatted into a data packet and returned to the host device 205 over the network connection 216 (and/or returned to another node attached to the cluster over the cluster fabric 215).

In one embodiment, storage of information on arrays 218, 220, 222 can be implemented as one or more storage "volumes" 230, 232 that are comprised of a cluster of disks 224, 226, 228 defining an overall logical arrangement of disk space. The disks 224, 226, 228 that comprise one or more volumes are typically organized as one or more groups of RAIDs. As an example, volume 230 comprises an aggregate of disk arrays 218 and 220, which comprise the cluster of disks 224 and 226.

In one embodiment, to facilitate access to disks 224, 226, 228, the operating system 208 may implement a file system (e.g., write anywhere file system) that logically organizes the information as a hierarchical structure of directories and files on the disks. In this embodiment, respective files may be implemented as a set of disk blocks configured to store information, whereas directories may be implemented as specially formatted files in which information about other files and directories are stored.

Whatever the underlying physical configuration within this data storage system 200, data can be stored as files within physical and/or virtual volumes, which can be associated with respective volume identifiers, such as file system identifiers (FSIDs), which can be 32-bits in length in one example.

A physical volume corresponds to at least a portion of physical storage devices whose address, addressable space, location, etc. doesn't change, such as at least some of one or more data storage devices 234 (e.g., a Redundant Array of Independent (or Inexpensive) Disks (RAID system)). Typically the location of the physical volume doesn't change in that the (range of) address(es) used to access it generally remains constant.

A virtual volume, in contrast, is stored over an aggregate of disparate portions of different physical storage devices. The virtual volume may be a collection of different available portions of different physical storage device locations, such as some available space from each of the disks 224, 226, and/or 228. It will be appreciated that since a virtual volume is not "tied" to any one particular storage device, a virtual volume can be said to include a layer of abstraction or virtualization, which allows it to be resized and/or flexible in some regards.

Further, a virtual volume can include one or more logical unit numbers (LUNs) 238, directories 236, Qtrees 235, and files 240. Among other things, these features, but more particularly LUNS, allow the disparate memory locations within which data is stored to be identified, for example, and grouped as data storage unit. As such, the LUNs 238 may be characterized as constituting a virtual disk or drive upon which data within the virtual volume is stored within the aggregate. For example, LUNs are often referred to as virtual drives, such that they emulate a hard drive from a general purpose computer, while they actually comprise data blocks stored in various parts of a volume.

In one embodiment, one or more data storage devices 234 can have one or more physical ports, wherein each physical port can be assigned a target address (e.g., SCSI target address). To represent respective volumes stored on a data storage device, a target address on the data storage device can be used to identify one or more LUNs 238. Thus, for example, when the node 202 connects to a volume 230, 232 through the storage adapter 214, a connection between the node 202 and the one or more LUNs 238 underlying the volume is created.

In one embodiment, respective target addresses can identify multiple LUNs, such that a target address can represent multiple volumes. The I/O interface, which can be implemented as circuitry and/or software in the storage adapter 214 or as executable code residing in memory 206 and executed by the processors 204, for example, can connect to volume 230 by using one or more addresses that identify the LUNs 238.

It may be appreciated that configuration inconsistency identification may be implemented for the data storage system 200. For example, a configuration comparison component may be implemented for the node 202. The configuration comparison component may be configured to identify configuration inconsistencies between the node 202 and a second node, such as where the node 202 is hosted within a first storage cluster and the second node is hosted within a second storage cluster that is a disaster recovery partner for the first storage cluster.

Figure 3:
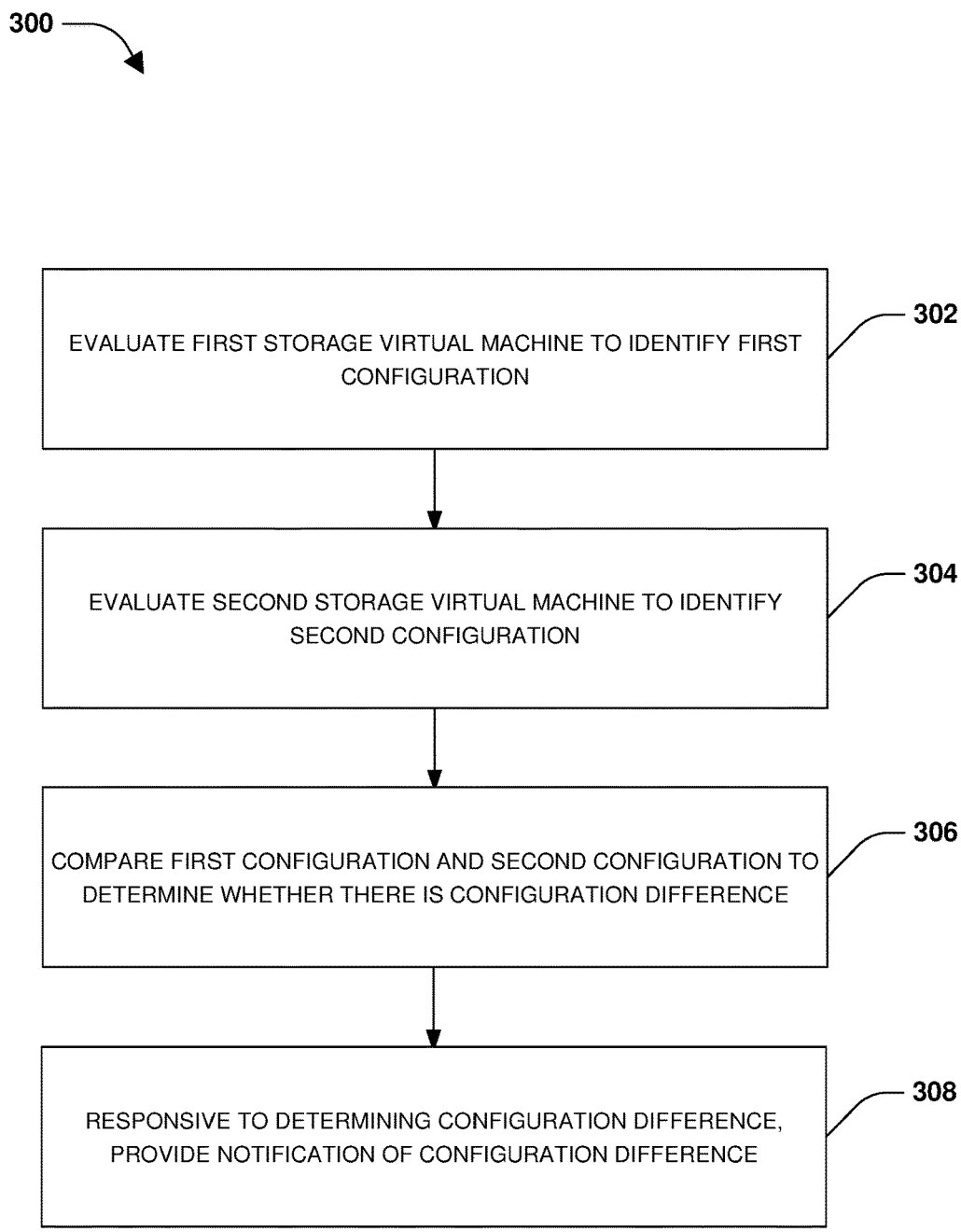
FIG. 3 is a flow chart illustrating an exemplary method of identifying configuration inconsistencies between storage virtual machines across storage clusters.

One embodiment of identifying configuration inconsistencies between storage virtual machines across storage clusters is illustrated by an exemplary method 300 of FIG. 3. A first storage cluster and a second storage cluster may be configured according to a disaster recovery configuration where user data and configuration data (e.g., volume information, LUN information, snapshot policy information, network interface information, routing route information, IP information, storage object information, user access policy information, storage configuration policy information, and/or other configuration and metadata associated with how storage is structured and managed by storage controllers and/or other storage applications and components) is synchronously or asynchronously replicated from the first storage cluster to the second storage cluster. That is, a first storage controller of the first storage cluster may provide primary client access to user data stored within a first storage virtual machine within the first storage cluster. The user data and configuration data of the first storage virtual machine may be replicated to the second storage cluster, such as into a second storage virtual machine, so that a second storage controller may provide failover client access to replicated user data within the second storage virtual machine in the event a disaster occurs at the first storage cluster. Responsive to the first storage cluster recovering from the disaster, the second storage cluster may switch back control to the first storage cluster for providing primary client access to user data from the first storage virtual machine.

Unfortunately, replication of the configuration data from the first storage virtual machine to the second storage virtual machine may fail for various reasons, such as a failure to transmit, apply, commit, and/or record, which may create inconsistencies between the storage virtual machines (e.g., if a name of a volume is changed on the first storage virtual machine, but the name is not replicated to a replicated volume on the second storage virtual machine, then in the event a failover to the second storage virtual machine occurs, a user may be unable to access the replicated volume having a stale out-of-date name because of the name difference). Accordingly, as provided herein, configuration between the first storage virtual machine and the second storage virtual machine is compared to identify configuration differences.

At 302, the first storage virtual machine may be evaluated to identify a first configuration of the first storage virtual machine. For example, a LUN, within the first storage virtual machine, may have a LUN name "LUN_USERA", a size of 500 GB, is accessible through an IP address 111.222.444.55, has a snapshot policy of creating a snapshot every 4 days, and has other configuration properties. The first configuration may reflect a current state of configuration data of the first storage virtual machine, such as a current state of LUN configuration data. At 304, the second storage virtual machine may be evaluated to identify a second configuration of a second storage virtual machine. For example, a replicated LUN within the second storage virtual machine, that is a replication/mirroring of the LUN within the first storage virtual machine, may have the LUN name "LUN_USERA", a size of 300 GB (e.g., a resize of the LUN from 300 GB to 500 GB, at the first storage virtual machine, may have failed to replicate to the replicated LUN, and thus the replicated LUN may have a stale out-of-date size), is accessible through the IP address 111.222.444.55, has the snapshot policy of creating a snapshot every 4 days, and has other configuration properties.

At 306, the first configuration and the second configuration may be compared to determine whether there is a configuration difference between the first storage virtual machine and the second storage virtual machine. In an example, the comparison may be performed in real-time during operation of the first storage cluster and the second storage cluster (e.g., during replication of user data and/or configuration data from the first storage cluster to the second storage cluster). In an example, volume information, LUN information, snapshot policies, network interfaces, routing routes, IP information, storage object information, user access policies, storage configuration policies, and/or other configuration data may be compared between the first configuration and the second configuration. For example, a LUN size configuration difference may be detected based upon the LUN, within the first storage virtual machine, having the most up-to-date 500 GB size and the replicated LUN, within the second storage virtual machine, having the stale out-of-date 300 GB size.

At 308, responsive to determining the configuration difference, a notification of the configuration difference may be provided. For example, the LUN size configuration difference may be detailed through a storage administrator user interface, a storage administration website, an email, a client interface, etc. In an example, the notification may specify that the configuration difference resulted from a failure to transfer configuration mirroring data (e.g., a resize operation performed upon the LUN within the first storage virtual machine) from the first storage cluster to the second storage cluster for applying to the second storage virtual machine. In an example, the notification may specify that the configuration difference resulted from a failure to apply the configuration mirroring data to the second storage virtual machine. In an example, the notification may specify that the configuration difference resulted from a failure to record the configuration mirroring data for applying to the second storage virtual machine. In this way, a client or storage administrator may be notified of the configuration difference, such as a notification of a difference between volume information, snapshot policy information, network interface information, routing route information, IP information, storage object information, user access policy information, storage configuration policy information, etc.

Figure 4A:
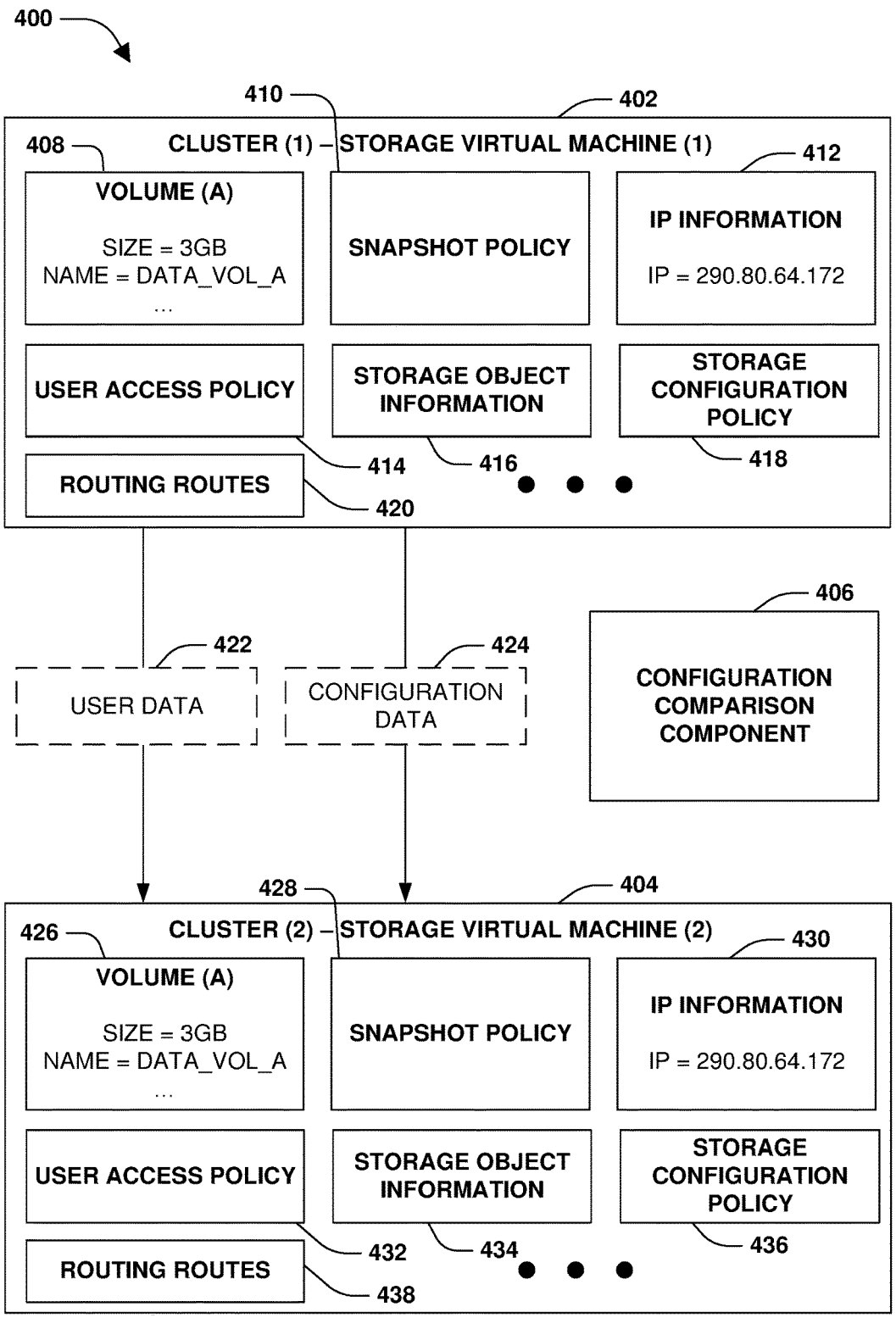
FIG. 4A is a component block diagram illustrating an exemplary system for identifying configuration inconsistencies between storage virtual machines across storage clusters.
Figure 4B:
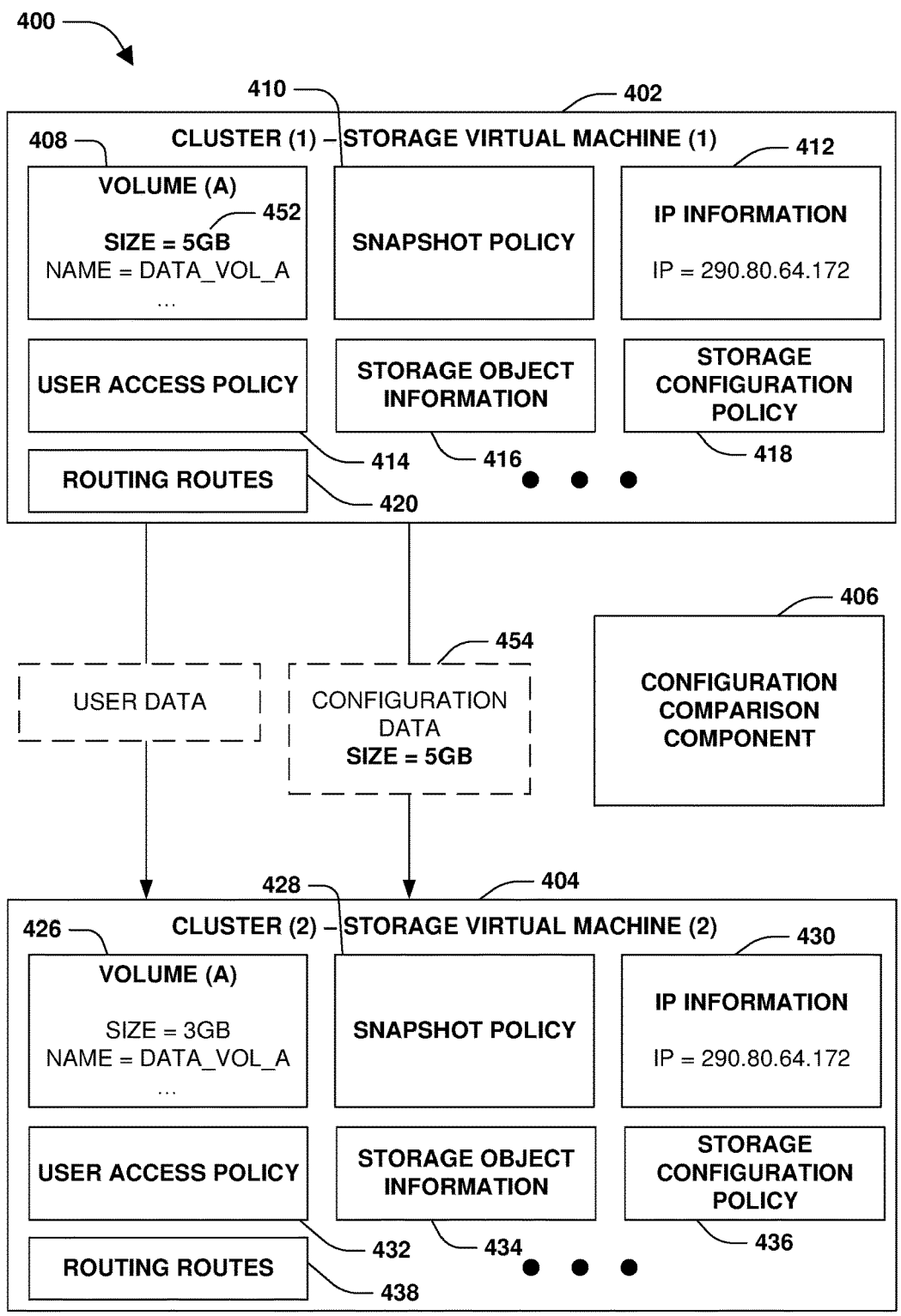
FIG. 4B is a component block diagram illustrating an exemplary system for identifying configuration inconsistencies between storage virtual machines across storage clusters, where user data and configuration data is replicated from a first storage virtual machine to a second storage virtual machine.
Figure 4C:
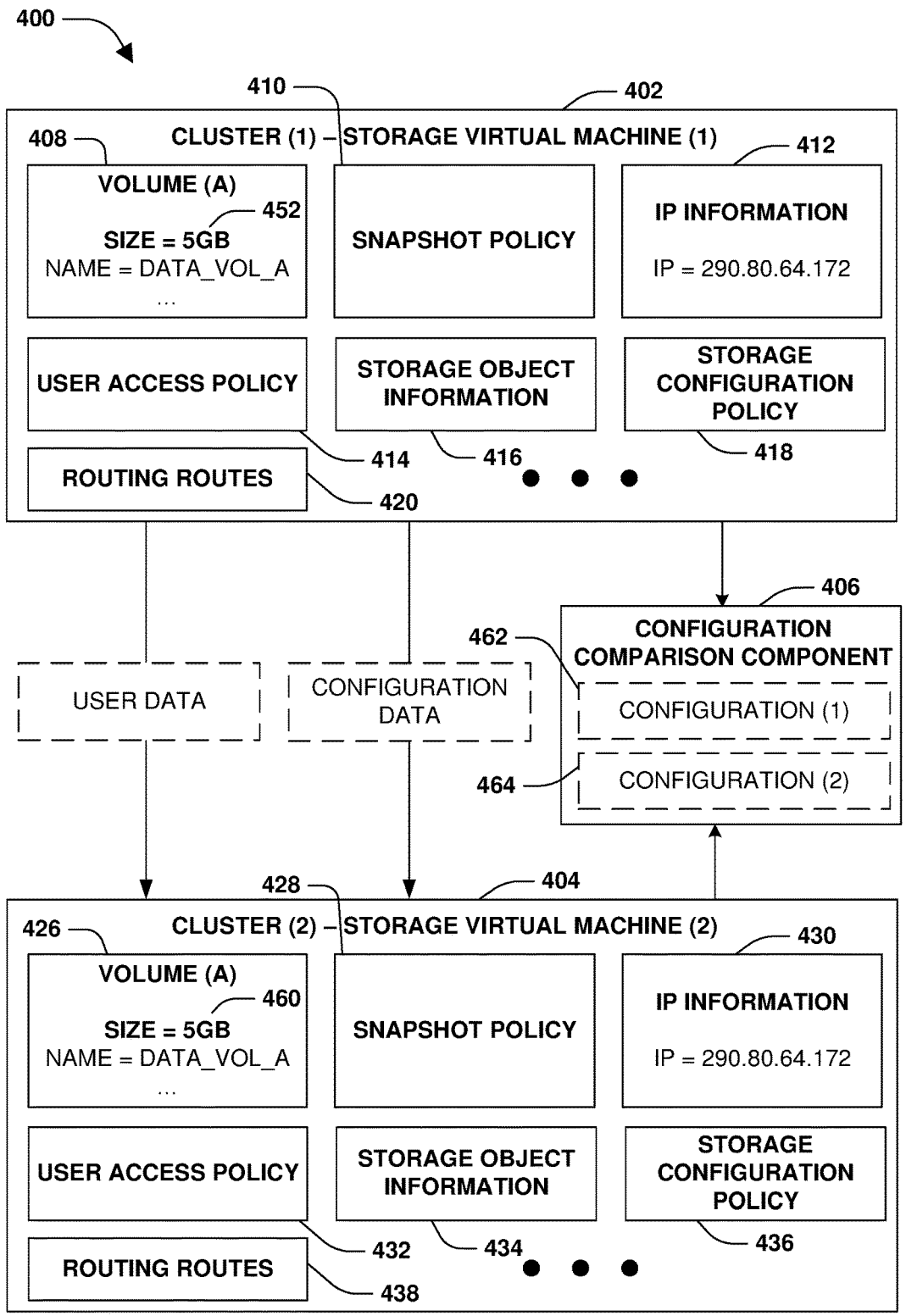
FIG. 4C is a component block diagram illustrating an exemplary system for identifying configuration inconsistencies between storage virtual machines across storage clusters, where a first configuration of a first storage virtual machine is compared with a second configuration of a second storage virtual machine.

FIGS. 4A-4C illustrate examples of a system 400, comprising a configuration comparison component 406, for identifying configuration inconsistencies between storage virtual machine across storage clusters. A first storage cluster 402 and a second storage cluster 404 may be configured according to a disaster recovery configuration, where changes to user data and configuration data managed by the first storage cluster 402 are backed up to the second storage cluster 404, and changes to user data and configuration data managed by the second storage cluster 404 are backed up to the first storage cluster 402. For example, user data 422 and configuration data 424 may be replicated from a first storage virtual machine of the first storage cluster 402 to a second storage virtual machine of the second storage cluster 404, as illustrated in FIG. 4A. The configuration data 424 may correspond to volume information 408, snapshot policy information 410, IP information 412, user access policy information 414, storage object information 416, storage configuration policy information 418, routing routes information 420, and/or other configuration information of the first storage virtual machine that may be replicated to the second storage virtual machine as replicated volume information 426, replicated snapshot policy information 428, replicated IP information 430, replicated user access policy information 432, replicated storage object information 434, replicated storage configuration policy information 436, replicated routing routes information 438, etc.

FIG. 4B illustrates a resize operation being performed upon a volume (A) of the first storage virtual machine, resulting in a new size 452 of 5 GB being configured through the volume information 408 for the volume (A). The new size 452 of 5 GB may be replicated as configuration mirroring data 454, from the first storage cluster 402 to the second storage cluster 404, to apply to a replicated volume (A), associated with the replicated volume information 426, of the second storage virtual machine.

FIG. 4C illustrates an example where the configuration mirroring data 454 is successfully applied to the replicated volume (A), resulting in a replicated new size 460 of 5 GB being configured through the replicated volume information 426 for the replicated volume (A). The configuration comparison component 406 may obtain, such as in real-time, a first configuration 462 of the first storage virtual machine of the first storage cluster 402 and a second configuration 464 of the second storage virtual machine of the second storage cluster 404. The configuration comparison component 406 may compare the first configuration 462 and the second configuration 464 to determine that no configuration differences exist (e.g., the new size 452 of 5 GB of the volume (A) on the first storage virtual machine was successfully replicated to the replicated volume (A) on the second storage virtual machine).

Figure 5A:
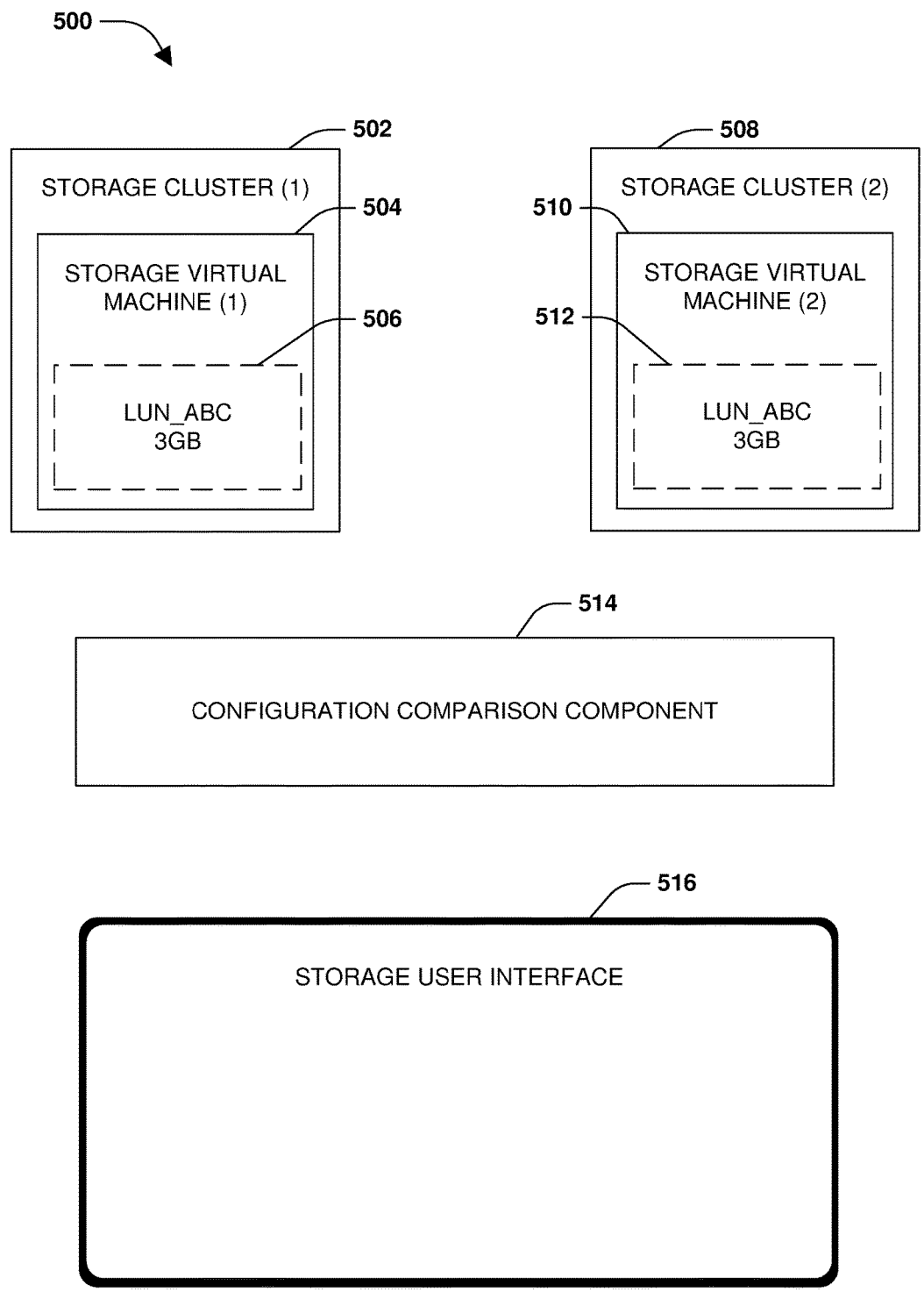
FIG. 5A is a component block diagram illustrating an exemplary system for identifying configuration inconsistencies between storage virtual machines across storage clusters.
Figure 5B:
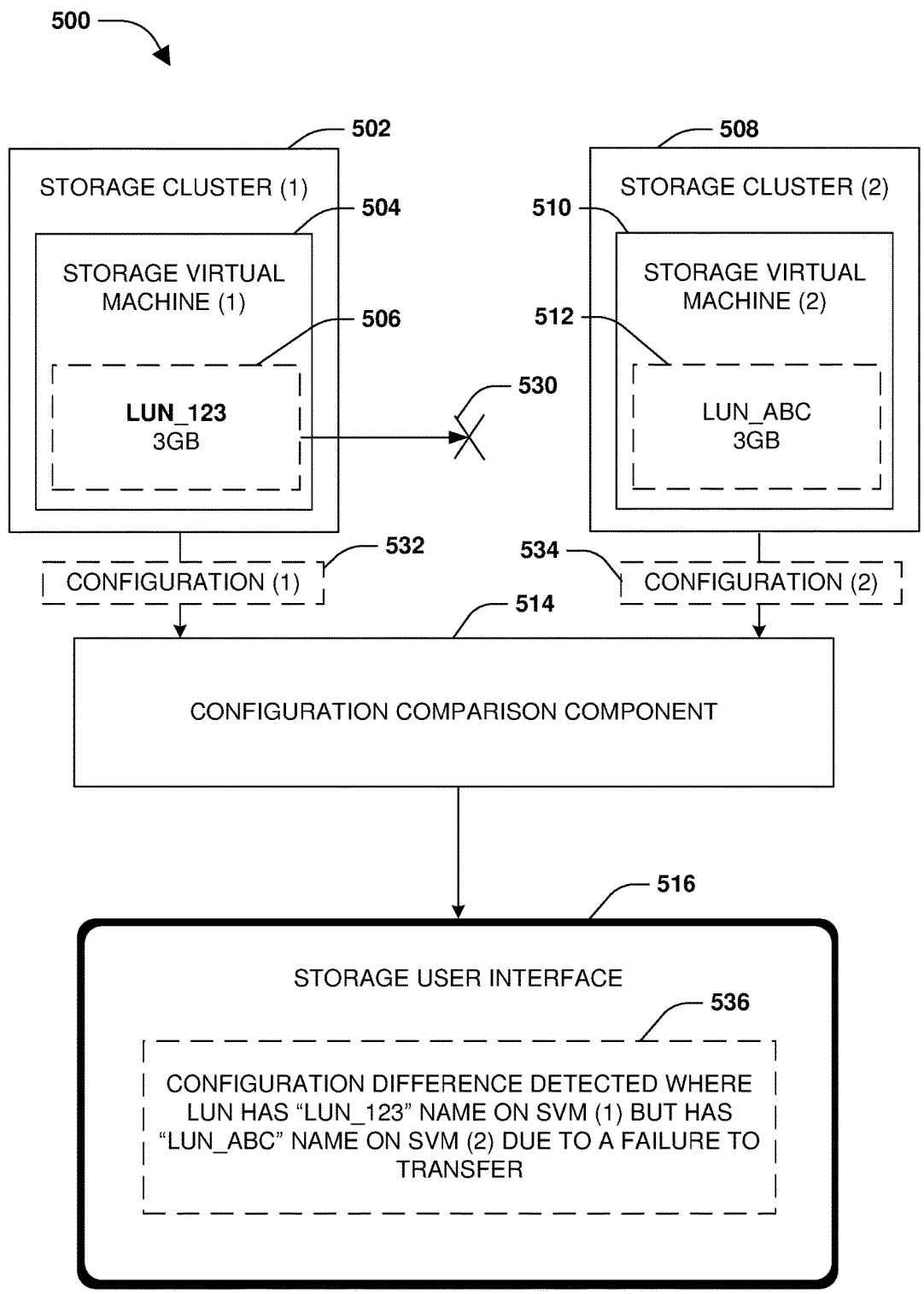
FIG. 5B is a component block diagram illustrating an exemplary system for identifying configuration inconsistencies between storage virtual machines across storage clusters, where configuration mirroring data fails to be transferred from a first storage cluster to a second storage cluster, resulting in a configuration difference.

FIGS. 5A-5B illustrate examples of a system 500, comprising a configuration comparison component 514 (e.g., hosted within a first storage cluster 502, a second storage cluster 508, or another location or computing device such as an administrator laptop or storage server), for identifying configuration inconsistencies between storage virtual machine across storage clusters. The first storage cluster 502 and the second storage cluster 508 may be configured according to a disaster recovery configuration, where changes to user data and configuration data managed by the first storage cluster 502 are backed up to the second storage cluster 508 and changes to user data and configuration data managed by the second storage cluster 508 are backed up to the first storage cluster 502. For example, user data (e.g., user data within a LUN 506) and configuration data (e.g., a name "LUN_ABC" and a size of 3 GB of the LUN 506) may be replicated from a first storage virtual machine 504 of the first storage cluster 502 to a second storage virtual machine 510 of the second storage cluster 508 (e.g., to a replicated LUN 512 having the name "LUN_ABC" and the size of 3 GB), as illustrated in FIG. 5A.

FIG. 5B illustrates a LUN rename operation being applied to the LUN 506 within the first storage virtual machine 504. For example, the LUN 506 may be renamed from the name "LUN_ABC" to a new name "LUN_123". An attempt may be made to replicate/mirror the LUN rename operation, as configuration mirroring data, from the first storage cluster 502 to the second storage cluster 508 for application to the replicated LUN 512. However, transfer of the configuration mirroring data may fail 530, and thus the replicated LUN 512 may have a stale out-of-date name of "LUN_ABC" instead of the new name "LUN_123". Thus, if a failover occurs from the first storage cluster 502 to the second storage cluster 508 due to a disaster at the first storage cluster 502, the replicated LUN 512 may be inaccessible to clients using the new name "LUN_123".

The configuration comparison component 514 may obtain first configuration 532, corresponding to a current state of configuration data for the first storage virtual machine 504 such as the LUN 506, from the first storage cluster 502. The configuration comparison component 514 may obtain second configuration 534, corresponding to a current state of configuration data for the second storage virtual machine 510 such as the replicated LUN 512, from the second storage cluster 508. The configuration comparison component 514 may compare the first configuration 532 and the second configuration 534 to determine a LUN name configuration difference between the LUN 506 and the replicated LUN 512 due to the transfer failure 530 of the configuration mirroring data. The configuration comparison component 514 may provide a notification 536 of the LUN name configuration difference, such as through a storage user interface 536.

Figure 6A:
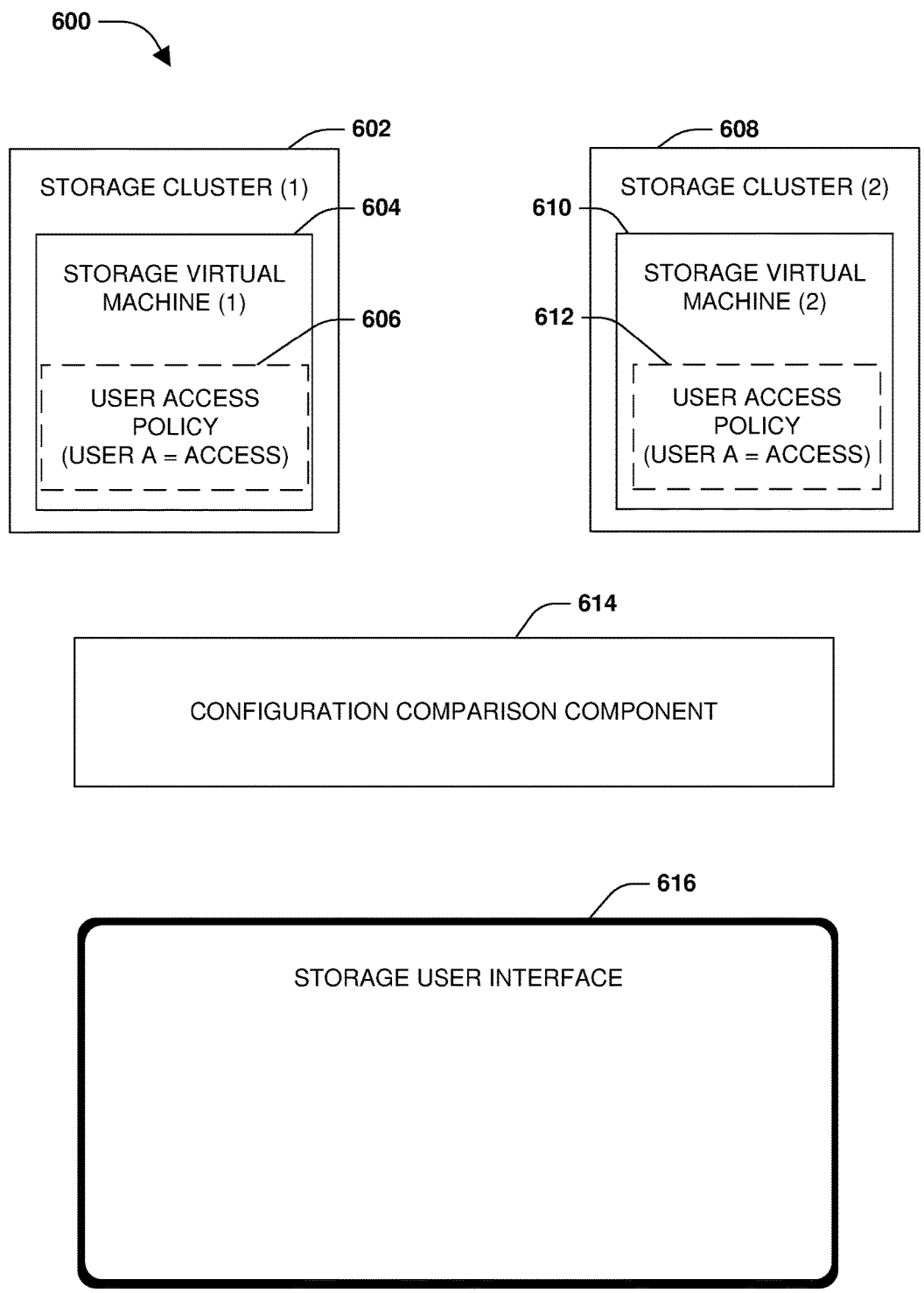
FIG. 6A is a component block diagram illustrating an exemplary system for identifying configuration inconsistencies between storage virtual machines across storage clusters.
Figure 6B:
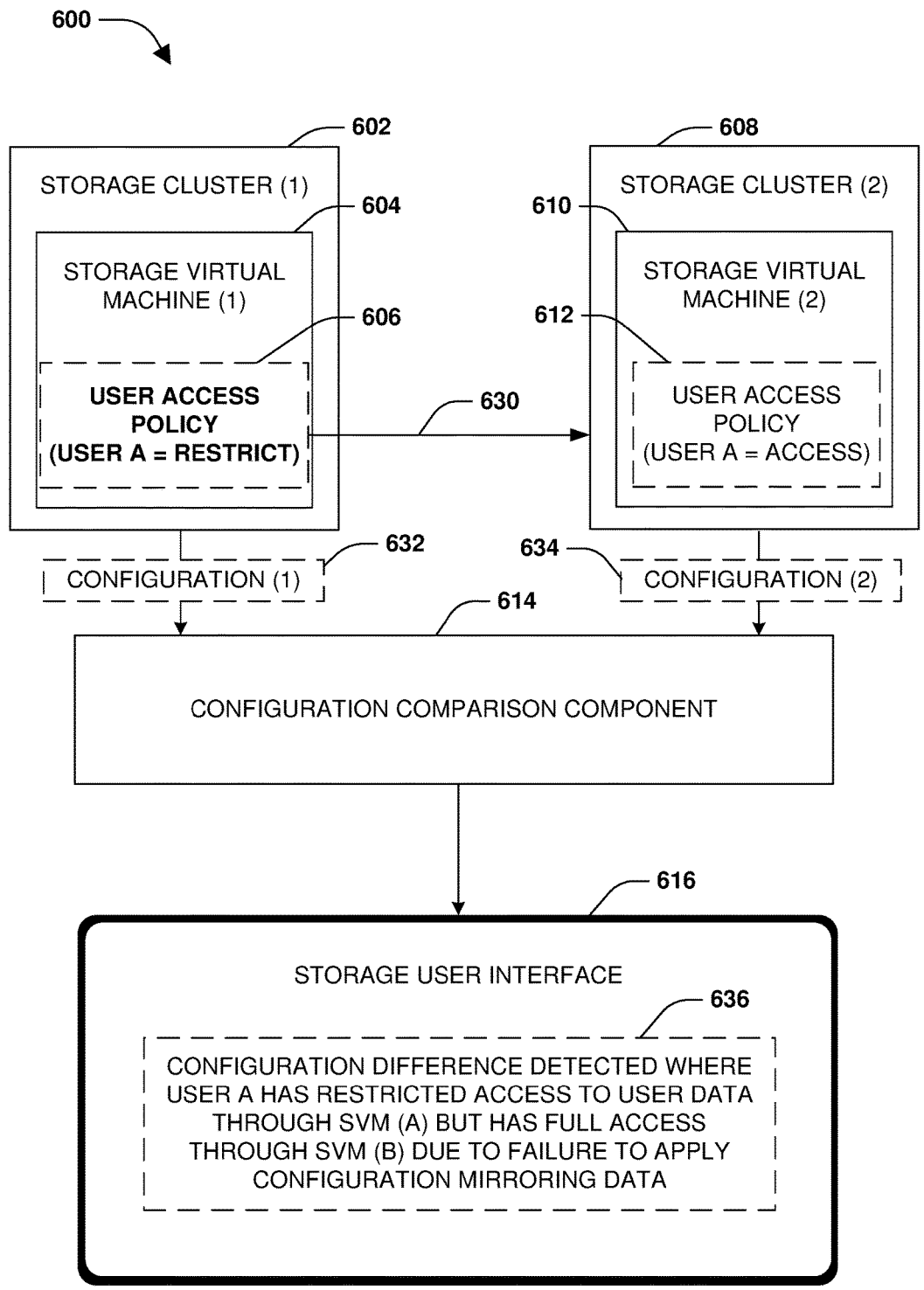
FIG. 6B is a component block diagram illustrating an exemplary system for identifying configuration inconsistencies between storage virtual machines across storage clusters, where configuration mirroring data fails to be applied to a replicated user access policy, resulting in a configuration difference.

FIGS. 6A-6B illustrate examples of a system 600, comprising a configuration comparison component 614 (e.g., hosted within a first storage cluster 602, a second storage cluster 608, or another location or computing device such as an administrator laptop or storage server), for identifying configuration inconsistencies between storage virtual machine across storage clusters. The first storage cluster 602 and the second storage cluster 608 may be configured according to a disaster recovery configuration, where changes to user data and configuration data managed by the first storage cluster 602 are backed up to the second storage cluster 608 and changes to user data and configuration data managed by the second storage cluster 608 are backed up to the first storage cluster 602. For example, user data and configuration data (e.g., a user access policy 606 specifying that a user (A) has access to a storage object) may be replicated from a first storage virtual machine 604 of the first storage cluster 602 to a second storage virtual machine 610 of the second storage cluster 608 (e.g., to a replicated user access policy 612 specifying that the user (A) has access to the storage object), as illustrated in FIG. 6A.

FIG. 6B illustrates a user access modification operation being applied to the user access policy 606 within the first storage virtual machine 604. For example, the user access policy 606 may be modified to specify that the user (A) now has restricted access to the storage object. An attempt may be made to replicate/mirror the user access modification operation, as configuration mirroring data, from the first storage cluster 602 to the second storage cluster 608 for application to the replicated user access policy 612. However, the configuration mirroring data may fail to be applied to the replicated user access policy 612. Thus, if a failover occurs from the first storage cluster 602 to the second storage cluster 608 due to a disaster at the first storage cluster 602, the user (A) may have undesirable full access to the storage object as opposed to the restricted access.

The configuration comparison component 614 may obtain first configuration 632, corresponding to a current state of configuration data for the first storage virtual machine 604 such as the user access policy 606, from the first storage cluster 602. The configuration comparison component 614 may obtain second configuration 634, corresponding to a current state of configuration data for the second storage virtual machine 610 such as the replicated user access policy 612, from the second storage cluster 608. The configuration comparison component 614 may compare the first configuration 632 and the second configuration 634 to determine a user access policy configuration difference between the user access policy 606 and the replicated user access policy 612 due to the failure to apply the configuration mirroring data to the replicated user access policy 612. The configuration comparison component 614 may provide a notification 636 of the user access policy configuration difference, such as through a storage user interface 636.

Figure 7A:
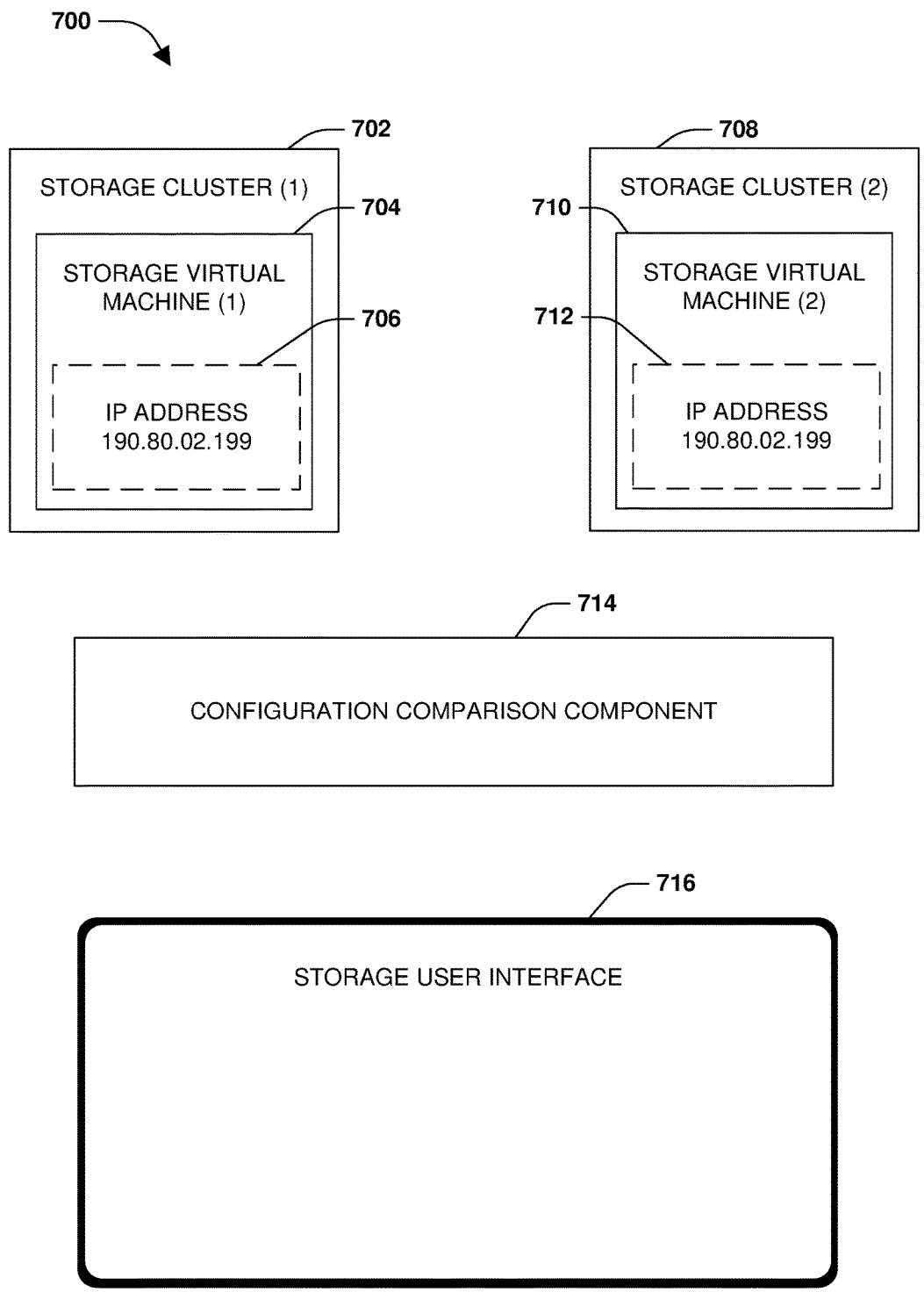
FIG. 7A is a component block diagram illustrating an exemplary system for identifying configuration inconsistencies between storage virtual machines across storage clusters.
Figure 7B:
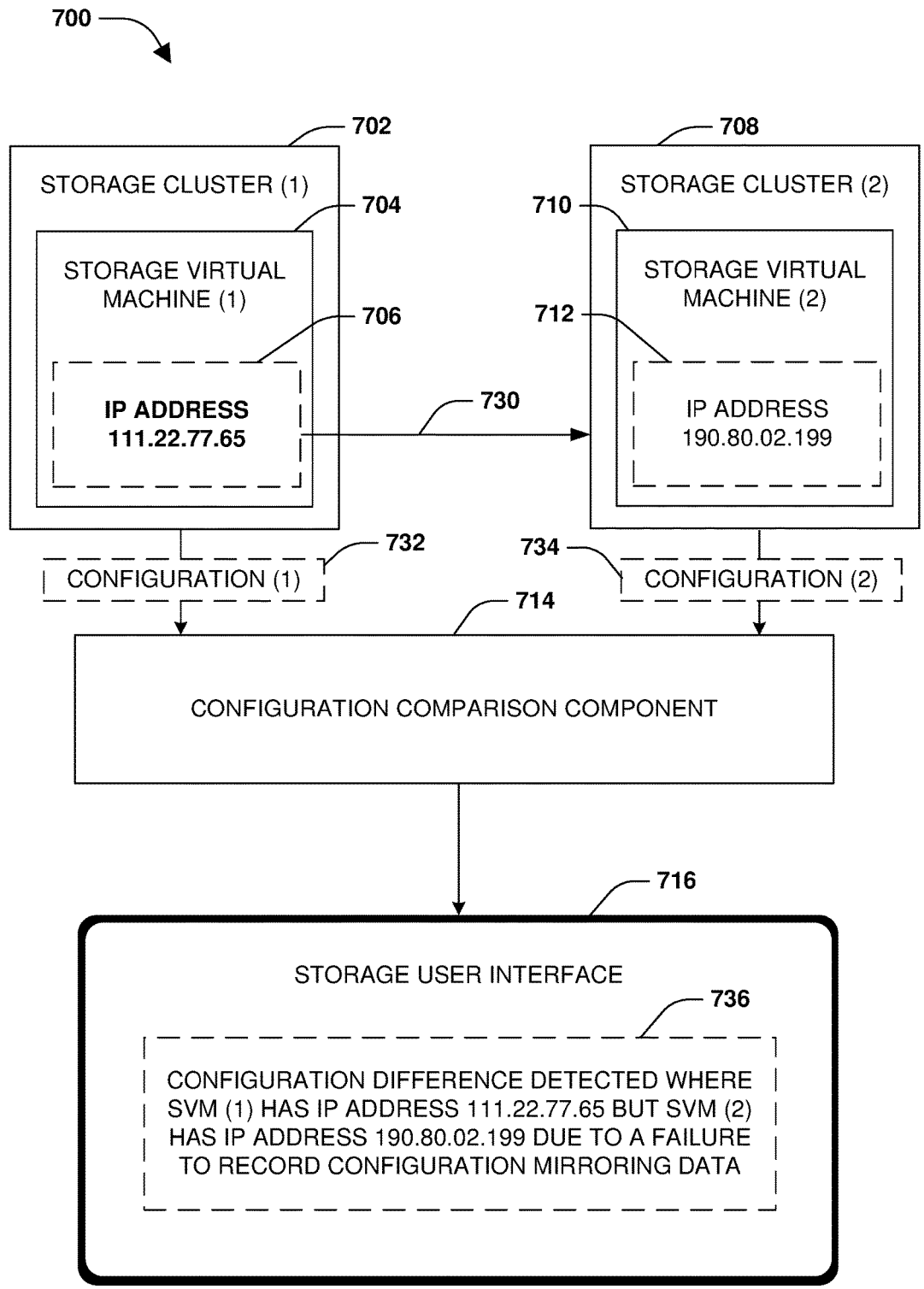
FIG. 7B is a component block diagram illustrating an exemplary system for identifying configuration inconsistencies between storage virtual machines across storage clusters, where configuration mirroring data fails to be recorded for a replicated IP address, resulting in a configuration difference.

FIGS. 7A-7B illustrate examples of a system 700, comprising a configuration comparison component 714 (e.g., hosted within a first storage cluster 702, a second storage cluster 708, or another location or computing device such as an administrator laptop or storage server), for identifying configuration inconsistencies between storage virtual machine across storage clusters. The first storage cluster 702 and the second storage cluster 708 may be configured according to a disaster recovery configuration, where changes to user data and configuration data managed by the first storage cluster 702 are backed up to the second storage cluster 708 and changes to user data and configuration data managed by the second storage cluster 708 are backed up to the first storage cluster 702. For example, user data and configuration data (e.g., an IP address 706 of 190.80.02.199) may be replicated from a first storage virtual machine 704 of the first storage cluster 702 to a second storage virtual machine 710 of the second storage cluster 708 (e.g., to a replicated IP address 712 of 190.80.02.199), as illustrated in FIG. 7A.

FIG. 7B illustrates an IP address modification operation being applied to the IP address 706 within the first storage virtual machine 704. For example, the IP address 706 may be modified to a new IP address of 111.22.77.65. An attempt may be made to replicate/mirror the IP address modification operation, as configuration mirroring data, from the first storage cluster 702 to the second storage cluster 708 for application to the replicated IP address 712. However, the configuration mirroring data may fail to be recorded for the replicated IP address 712. Thus, if a failover occurs from the first storage cluster 702 to the second storage cluster 708 due to a disaster at the first storage cluster 702, users may be unable to access applications, user data, databases, and/or other components accessible through the replicated IP address 712.

The configuration comparison component 714 may obtain first configuration 732, corresponding to a current state of configuration data for the first storage virtual machine 704 such as the IP address 706, from the first storage cluster 702. The configuration comparison component 714 may obtain second configuration 734, corresponding to a current state of configuration data for the second storage virtual machine 710 such as the replicated IP address 712, from the second storage cluster 708. The configuration comparison component 714 may compare the first configuration 732 and the second configuration 734 to determine an IP address configuration difference between the IP address 706 and the replicated IP address 712 due to the failure to record the configuration mirroring data for the replicated IP address 712. The configuration comparison component 714 may provide a notification 736 of the IP address configuration difference, such as through a storage user interface 736.

Figure 8:
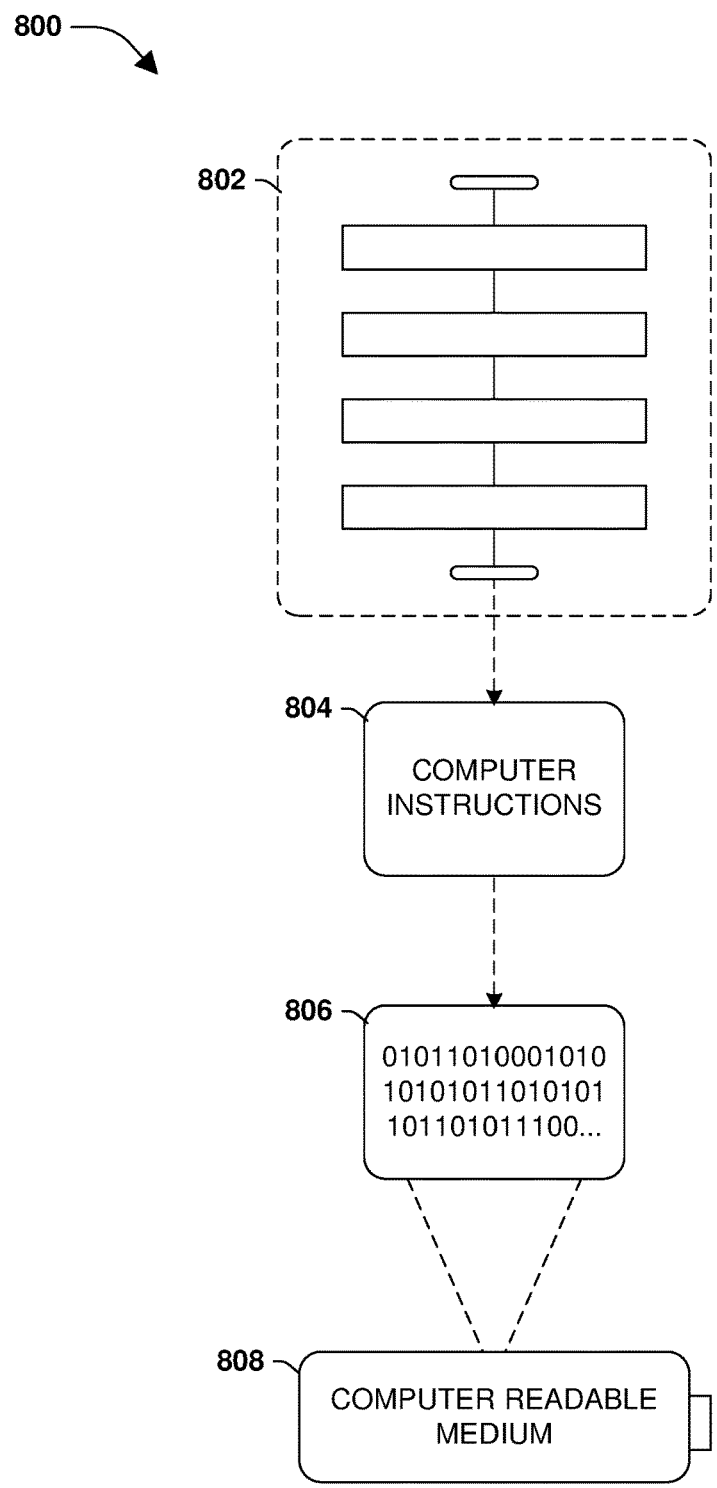
FIG. 8 is an example of a computer readable medium in accordance with one or more of the provisions set forth herein.

Still another embodiment involves a computer-readable medium comprising processor-executable instructions configured to implement one or more of the techniques presented herein. An example embodiment of a computer-readable medium or a computer-readable device that is devised in these ways is illustrated in FIG. 8, wherein the implementation 800 comprises a computer-readable medium 808, such as a CD-ft DVD-R, flash drive, a platter of a hard disk drive, etc., on which is encoded computer-readable data 806. This computer-readable data 806, such as binary data comprising at least one of a zero or a one, in turn comprises a set of computer instructions 804 configured to operate according to one or more of the principles set forth herein. In some embodiments, the processor-executable computer instructions 804 are configured to perform a method 802, such as at least some of the exemplary method 300 of FIG. 3, for example. In some embodiments, the processor-executable instructions 804 are configured to implement a system, such as at least some of the exemplary system 400 of FIGS. 4A-4C, at least some of the exemplary system 500 of FIGS. 5A-5B, at least some of the exemplary system 600 of FIGS. 6A-6B, and/or at least some of the exemplary system 700 of FIGS. 7A-7B, for example. Many such computer-readable media are contemplated to operate in accordance with the techniques presented herein.

It will be appreciated that processes, architectures and/or procedures described herein can be implemented in hardware, firmware and/or software. It will also be appreciated that the provisions set forth herein may apply to any type of special-purpose computer (e.g., file host, storage server and/or storage serving appliance) and/or general-purpose computer, including a standalone computer or portion thereof, embodied as or including a storage system. Moreover, the teachings herein can be configured to a variety of storage system architectures including, but not limited to, a network-attached storage environment and/or a storage area network and disk assembly directly attached to a client or host computer. Storage system should therefore be taken broadly to include such arrangements in addition to any subsystems configured to perform a storage function and associated with other equipment or systems.

In some embodiments, methods described and/or illustrated in this disclosure may be realized in whole or in part on computer-readable media. Computer readable media can include processor-executable instructions configured to implement one or more of the methods presented herein, and may include any mechanism for storing this data that can be thereafter read by a computer system. Examples of computer readable media include (hard) drives (e.g., accessible via network attached storage (NAS)), Storage Area Networks (SAN), volatile and non-volatile memory, such as read-only memory (ROM), random-access memory (RAM), EEPROM and/or flash memory, CD-ROMs, CD-Rs, CD-RWs, DVDs, cassettes, magnetic tape, magnetic disk storage, optical or non-optical data storage devices and/or any other medium which can be used to store data.

Although the subject matter has been described in language specific to structural features or methodological acts, it is to be understood that the subject matter defined in the appended claims is not necessarily limited to the specific features or acts described above. Rather, the specific features and acts described above are disclosed as example forms of implementing at least some of the claims.

Various operations of embodiments are provided herein. The order in which some or all of the operations are described should not be construed to imply that these operations are necessarily order dependent. Alternative ordering will be appreciated given the benefit of this description. Further, it will be understood that not all operations are necessarily present in each embodiment provided herein. Also, it will be understood that not all operations are necessary in some embodiments.

Furthermore, the claimed subject matter is implemented as a method, apparatus, or article of manufacture using standard application or engineering techniques to produce software, firmware, hardware, or any combination thereof to control a computer to implement the disclosed subject matter. The term "article of manufacture" as used herein is intended to encompass a computer application accessible from any computer-readable device, carrier, or media. Of course, many modifications may be made to this configuration without departing from the scope or spirit of the claimed subject matter.

As used in this application, the terms "component", "module," "system", "interface", and the like are generally intended to refer to a computer-related entity, either hardware, a combination of hardware and software, software, or software in execution. For example, a component includes a process running on a processor, a processor, an object, an executable, a thread of execution, an application, or a computer. By way of illustration, both an application running on a controller and the controller can be a component. One or more components residing within a process or thread of execution and a component may be localized on one computer or distributed between two or more computers.

Moreover, "exemplary" is used herein to mean serving as an example, instance, illustration, etc., and not necessarily as advantageous. As used in this application, "or" is intended to mean an inclusive "or" rather than an exclusive "or". In addition, "a" and "an" as used in this application are generally be construed to mean "one or more" unless specified otherwise or clear from context to be directed to a singular form. Also, at least one of A and B and/or the like generally means A or B and/or both A and B. Furthermore, to the extent that "includes", "having", "has", "with", or variants thereof are used, such terms are intended to be inclusive in a manner similar to the term "comprising".

Many modifications may be made to the instant disclosure without departing from the scope or spirit of the claimed subject matter. Unless specified otherwise, "first," "second," or the like are not intended to imply a temporal aspect, a spatial aspect, an ordering, etc. Rather, such terms are merely used as identifiers, names, etc. for features, elements, items, etc. For example, a first set of information and a second set of information generally correspond to set of information A and set of information B or two different or two identical sets of information or the same set of information.

Also, although the disclosure has been shown and described with respect to one or more implementations, equivalent alterations and modifications will occur to others skilled in the art based upon a reading and understanding of this specification and the annexed drawings. The disclosure includes all such modifications and alterations and is limited only by the scope of the following claims. In particular regard to the various functions performed by the above described components (e.g., elements, resources, etc.), the terms used to describe such components are intended to correspond, unless otherwise indicated, to any component which performs the specified function of the described component (e.g., that is functionally equivalent), even though not structurally equivalent to the disclosed structure. In addition, while a particular feature of the disclosure may have been disclosed with respect to only one of several implementations, such feature may be combined with one or more other features of the other implementations as may be desired and advantageous for any given or particular application.

What is claimed is:

1. A computing device, comprising:
   a memory comprising machine executable code having stored thereon instructions for performing a method; and
   a processor coupled to the memory, the processor configured to execute the instructions to cause the processor to:
      determine that there is a configuration difference between a first configuration of a first storage virtual machine of a first cluster and a second configuration of a second storage virtual machine of a second cluster based upon a failure to record configuration mirroring data sent from the first cluster to the second cluster for applying to the second storage virtual machine; and
      provide a notification of the configuration difference.

2. The computing device of claim 1, wherein the instructions cause the processor to:
   compare storage information between the first configuration and the second configuration to identify the configuration difference.

3. The computing device of claim 1, wherein the instructions cause the processor to:
   specify, through the notification, that the configuration difference resulted based upon the failure to record the configuration mirroring data.

4. The computing device of claim 2, wherein the instructions cause the processor to:
   perform the comparison in real-time during replication of user data and configuration data from the first cluster to the second cluster.

5. The computing device of claim 2, wherein the instructions cause the processor to:

perform the comparison in real-time during operation of the first cluster and the second cluster.

6. The computing device of claim 4, the replication comprising a synchronous replication operation that transfers the configuration data to the second cluster for application to the second storage virtual machine in real-time.

7. The computing device of claim 4, the replication comprising an asynchronous replication operation.

8. A method, comprising:
    determining that there is a configuration difference between a first configuration of a first storage virtual machine of a first cluster and a second configuration of a second storage virtual machine of a second cluster based upon a failure to transfer configuration mirroring data from the first cluster to the second cluster for applying to the second storage virtual machine; and
    providing a notification of the configuration difference.

9. The method of claim 8, comprising:
    specify, through the notification, that the configuration difference resulted based upon the failure to transfer the configuration mirroring data.

10. The method of claim 8, the first cluster and the second cluster configured according to a disaster recovery configuration.

11. The method of claim 10, the second cluster configured to provide failover client access to the second storage virtual machine based upon a disaster occurring at the first cluster that renders the first storage virtual machine inaccessible to clients.

12. The method of claim 11, the second cluster configured to switch back to the first cluster for primary client access to the first storage virtual machine based upon the first cluster recovering from the disaster.

13. The method of claim 11, the first storage virtual machine configured for primary client access and the second storage virtual machine configured as a backup storage virtual machine for failover client access when the first storage virtual machine is inaccessible for primary client access.

14. A non-transitory computer readable medium comprising instructions for performing a method, which when executed by a machine, causes the machine to:
    determine that there is a configuration difference between a first configuration of a first storage virtual machine of a first cluster and a second configuration of a second storage virtual machine of a second cluster based upon a failure to apply configuration mirroring data, sent from the first cluster to the second cluster, to the second storage virtual machine; and
    provide a notification of the configuration difference.

15. The non-transitory computer readable medium of claim 14, wherein the instructions cause the machine to:
    specify, through the notification, that the configuration difference resulted based upon the failure to apply the configuration mirroring data.

16. The non-transitory computer readable medium of claim 14, the first cluster and the second cluster configured according to a disaster recovery configuration.

17. The non-transitory computer readable medium of claim 14, the second cluster configured to provide failover client access to the second storage virtual machine based upon a disaster occurring at the first cluster that renders the first storage virtual machine inaccessible to clients.

18. The non-transitory computer readable medium of claim 17, the second cluster configured to switch back to the first cluster for primary client access to the first storage virtual machine based upon the first cluster recovering from the disaster.

19. The non-transitory computer readable medium of claim 17, the first storage virtual machine configured for primary client access and the second storage virtual machine configured as a backup storage virtual machine for failover client access when the first storage virtual machine is inaccessible for primary client access.

20. The non-transitory computer readable medium of claim 14,
    compare storage information between the first configuration and the second configuration to identify the configuration difference.

* * * * *